US012639385B2

(12) United States Patent
Li

(10) Patent No.: US 12,639,385 B2
(45) Date of Patent: May 26, 2026

(54) INFORMATION PRESENTATION METHOD AND APPARATUS, AND DEVICE AND MEDIUM

(71) Applicant: BEIJING BYTEDANCE NETWORK TECHNOLOGY CO., LTD., Beijing (CN)

(72) Inventor: Linmeng Li, Beijing (CN)

(73) Assignee: BEIJING BYTEDANCE NETWORK TECHNOLOGY CO., LTD., Beijing (CN)

(*) Notice: Subject to any disclaimer, the term of this patent is extended or adjusted under 35 U.S.C. 154(b) by 124 days.

(21) Appl. No.: 18/548,452

(22) PCT Filed: Apr. 11, 2022

(86) PCT No.: PCT/CN2022/086000
§ 371 (c)(1),
(2) Date: Jan. 17, 2024

(87) PCT Pub. No.: WO2022/252822
PCT Pub. Date: Dec. 8, 2022

(65) Prior Publication Data
US 2024/0143684 A1 May 2, 2024

(30) Foreign Application Priority Data
May 31, 2021 (CN) .......................... 202110601188.5

(51) Int. Cl.
*G06F 16/9538* (2019.01)
*G06F 16/904* (2019.01)
*G06F 16/906* (2019.01)

(52) U.S. Cl.
CPC ........ *G06F 16/9538* (2019.01); *G06F 16/904* (2019.01); *G06F 16/906* (2019.01)

(58) Field of Classification Search
CPC .... G06F 18/22; G06F 40/289; G06F 16/9538; G06F 16/9535; G06F 16/9536;
(Continued)

(56) References Cited

U.S. PATENT DOCUMENTS 9,792,020 B1    10/2017  Kelley et al.
10,769,176 B2 *  9/2020  Chino ................... G06F 40/134
(Continued)

FOREIGN PATENT DOCUMENTS

CN        102521263 B      3/2016
CN        107038186 A      8/2017
(Continued)

OTHER PUBLICATIONS

International Search Report and Written Opinion, International Patent Application No. PCT/CN2022/086000, Jun. 27, 2022, with English translation of Search Report (9 pages).
(Continued)

*Primary Examiner* — Kris E Mackes
(74) *Attorney, Agent, or Firm* — Astute IP Law Group

(57) ABSTRACT

Embodiments of the present disclosure relate to an information presentation method and an apparatus, a device, and a medium. The method includes the steps described below. Collection information of at least one collection is acquired. The collection information includes title information of each collection and attribute information of multiple entities in the each collection. Attribute information of each entity matches the title information of the each collection. All or part of the collection information of the at least one collection is presented.

17 Claims, 8 Drawing Sheets

---

<      ···

\#   Inventory of those excellent performers who graduated from famous universities Is there really a top student among stars? Let's take a look at the super real top students among the stars and have a glimpse of the charm of the world's famous universities by the way A total of twenty-four entities Star A
Actress from Mainland China
University A Star B
Film and television actress and host from Mainland China
University B Star C
Singer, actor, host, and professional racing driver
University C Star D
Actress from Mainland China
University D Star E
Chinese film and television actor
University E

(58) Field of Classification Search
CPC .... G06F 16/951; G06F 16/958; G06F 16/904;
G06F 16/906
See application file for complete search history.

(56) References Cited

U.S. PATENT DOCUMENTS

| | | | | |
|---|---|---|---|---|
| 11,250,008 | B2* | 2/2022 | Vittorio ................. | G06Q 50/10 |
| 2005/0038856 | A1* | 2/2005 | Krishnasamy ......... | H04L 51/00 |
| | | | | 709/206 |
| 2009/0300011 | A1 | 12/2009 | Taketa et al. | |
| 2013/0290320 | A1 | 10/2013 | Zhu et al. | |
| 2014/0006423 | A1* | 1/2014 | Melnychenko ... | G06F 16/24578 |
| | | | | 707/749 |
| 2014/0325376 | A1 | 10/2014 | Hveem | |
| 2015/0348160 | A1* | 12/2015 | Ravikant ........... | G06Q 30/0627 |
| | | | | 705/26.63 |
| 2016/0379289 | A1 | 12/2016 | More | |
| 2017/0140006 | A1* | 5/2017 | Yang ................. | G06F 16/2228 |
| 2017/0220676 | A1* | 8/2017 | Kang ................. | G06F 16/9038 |

FOREIGN PATENT DOCUMENTS

| | | | |
|---|---|---|---|
| CN | 109933692 | A | 6/2019 |
| CN | 110825988 | A | 2/2020 |
| CN | 111382385 | A | 7/2020 |
| CN | 111859195 | A | 10/2020 |
| CN | 112084268 | A | 12/2020 |
| CN | 112148977 | A | 12/2020 |
| CN | 113204691 | A | 8/2021 |
| WO | 2017/076038 | A1 | 5/2017 |

OTHER PUBLICATIONS

Office Action issued in Chinese Patent Application No. 202110601188. 5, Jan. 19, 2023, with machine translation (14 pages).
Office Action issued in Chinese Patent Application No. 202110601188. 5, Apr. 14, 2023, with machine translation (21 pages).

* cited by examiner

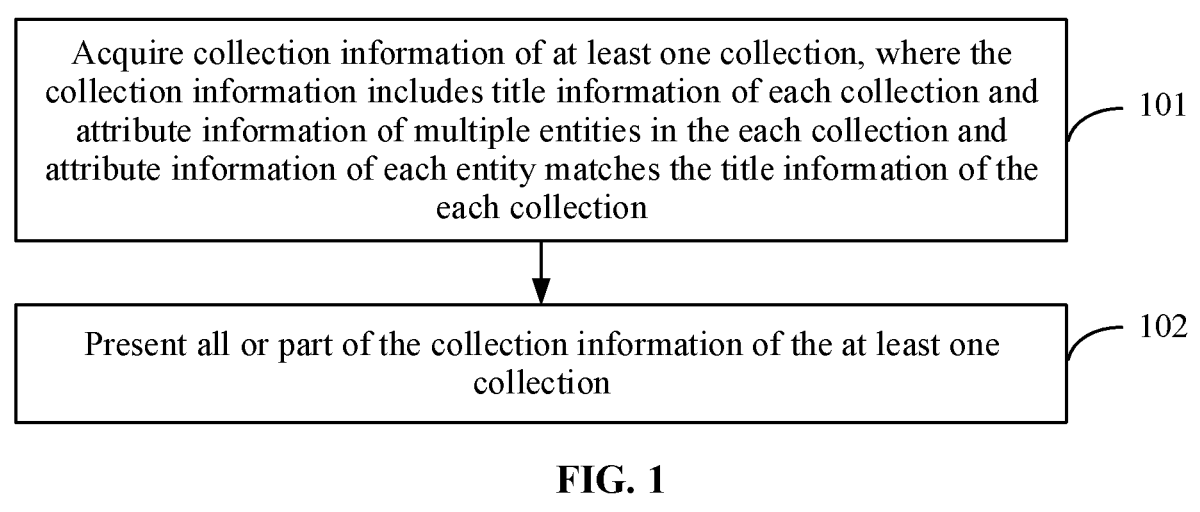

Acquire collection information of at least one collection, where the collection information includes title information of each collection and attribute information of multiple entities in the each collection and attribute information of each entity matches the title information of the each collection — 101

Present all or part of the collection information of the at least one collection — 102

FIG. 1

INFORMATION PRESENTATION METHOD AND APPARATUS, AND DEVICE AND MEDIUM

CROSS-REFERENCE TO RELATED APPLICATIONS

The present application is a national stage application filed under 35 U.S.C. 371 based on international patent application No. PCT/CN2022/086000, filed on Apr. 11, 2022, which claims priority to Chinese Patent Application No. 202110601188.5 filed with the China National Intellectual Property Administration (CNIPA) on May 31, 2021, the disclosures of which are incorporated herein by reference in their entireties.

TECHNICAL FIELD

The present disclosure relates to the technical field of the Internet, for example, an information presentation method and an apparatus, a device, and a medium

BACKGROUND

With the rapid development of Internet technology, people can learn many kinds of knowledge conveniently and quickly from the Internet.

In some content consumption scenarios, multiple entities having the same characteristics may be combined to form a collection. The collection may be presented to a user so that the user can have a deeper understanding of the connection between the entities. However, due to the limitation of the terminal screen size, the presentation content of one collection on a page is limited. Thus, the user needs to be redirected multiple times to fully understand the characteristics of each entity in the collection and cannot intuitively establish the connection between the entities in the collection.

SUMMARY

The present disclosure provides an information presentation method and an apparatus, a device, and a medium.

Embodiments of the present disclosure provide an information presentation method. The method includes the steps described below.

Collection information of at least one collection is acquired. The collection information includes title information of each collection of the at least one collection and attribute information of a plurality of entities in the each collection. Attribute information of each entity of the plurality of entities matches the title information of the each collection.

All or part of the collection information of the at least one collection is presented.

Embodiments of the present disclosure also provide an information presentation method. The method includes the steps described below.

A collection constituent element is acquired. Based on the collection constituent element, at least one collection is created. Each collection of the at least one collection includes a plurality of entities satisfying the collection constituent element.

Collection information of the at least one collection is determined. The collection information includes title information of each collection of the at least one collection and attribute information of each entity in the each collection.

The attribute information of the each entity matches the title information of the each collection.

The collection information of the at least one collection is sent to a client so that the client presents all or part of the collection information of the at least one collection.

Embodiments of the present disclosure also provide an information presentation apparatus. The apparatus includes an information acquisition module and an information presentation module.

The information acquisition module is configured to acquire collection information of at least one collection. The collection information includes title information of each collection of the at least one collection and attribute information of a plurality of entities in the each collection. Attribute information of each entity of the plurality of entities matches the title information of the each collection.

The information presentation module is configured to present all or part of the collection information of the at least one collection.

Embodiments of the present disclosure also provide an information presentation apparatus. The apparatus includes a collection creation module, an information determination module, and an information sending module.

The collection creation module is configured to acquire a collection constituent element and create, based on the collection constituent element, at least one collection. Each collection of the at least one collection includes a plurality of entities satisfying the collection constituent element.

The information determination module is configured to determine collection information of the at least one collection. The collection information includes title information of each collection of the at least one collection and attribute information of each entity in the each collection. The attribute information of the each entity matches the title information of the each collection.

The information sending module is configured to send the collection information of the at least one collection to a client so that the client presents all or part of the collection information of the at least one collection.

Embodiments of the present disclosure also provide an electronic device that includes a processor and a memory. The memory is configured to store instructions executable by the processor. The processor is configured to read the executable instructions from the memory and execute the instructions to implement the information presentation method provided by the embodiments of the present disclosure.

Embodiments of the present disclosure also provide a computer-readable storage medium, which stores a computer program configured to execute the information presentation method provided by the embodiments of the present disclosure.

BRIEF DESCRIPTION OF DRAWINGS

The same or similar reference numerals throughout the drawings denote the same or similar elements. It should be understood that the drawings are schematic and that the originals and elements are not necessarily drawn to scale.

FIG. 1 is a flowchart of an information presentation method according to an embodiment of the present disclosure.

DETAILED DESCRIPTION

Figure 2:
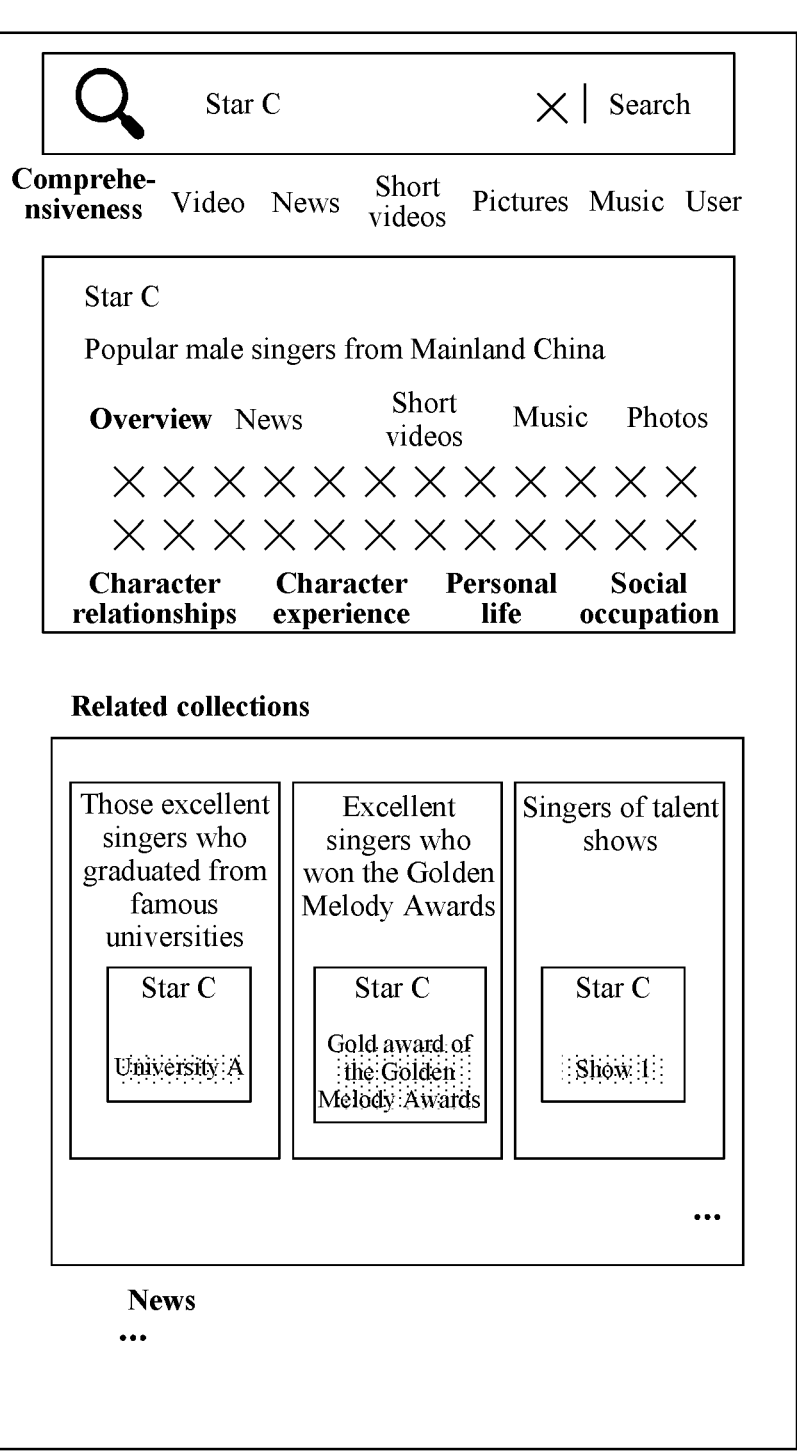
FIG. 2 is a diagram illustrating a collection presentation according to an embodiment of the present disclosure.

Embodiments of the present disclosure are described hereinafter with reference to the drawings. The drawings illustrate some embodiments of the present disclosure, but it should be understood that the present disclosure may be implemented in various manners and it should not be construed as limited to the embodiments set forth herein. On the contrary, these embodiments are provided for a more thorough and complete understanding of the present disclosure. It should be understood that the drawings and embodiments of the present disclosure are merely illustrative and are not intended to limit the scope of the present disclosure.

It should be understood that steps described in method embodiments of the present disclosure may be performed in sequence and/or in parallel. Additionally, the method embodiments may include additional steps and/or omit some of the illustrated steps. The scope of the present disclosure is not limited in this respect.

The term "include" and variations thereof used herein refer to "including, but not limited to". The term "based on" refers to "at least partially based on". The term "an embodiment" refers to "at least one embodiment". The term "another embodiment" refers to "at least one another embodiment". The term "some embodiments" refers to "at least some embodiments". Definitions of other terms are given in the description hereinafter.

It should be noted that concepts such as "first" and "second" in the present disclosure are used to distinguish between apparatuses, between modules, or between units and are not intended to limit the order or mutual dependence of the functions performed by these apparatuses, modules, or units.

It should be noted that "one" and "multiple" mentioned in the present disclosure are not limiting but illustrative and should be construed by those skilled in the art as "one or more" unless otherwise specified in the context.

The names of messages or information exchanged between multiple apparatuses in the embodiments of the present disclosure are used for illustrative purposes only and are not used to limit the scope of these messages or information.

At present, in some related products such as an encyclopedia product, a user can filter, according to the title of an encyclopedia collection, the content he/she likes to browse the encyclopedia collection. However, when entering a collection detail page, the user sees only entries, and since the presented content is limited, the user needs to read the detailed content of each entry in the collection or be redirected multiple times to fully understand the characteristics of each entry in the collection. Moreover, the user cannot establish the connection between the entries in the collection, resulting in a poor user experience. An embodiment of the present disclosure provides an information presentation method. The method is described below in conjunction with specific embodiments.

FIG. 1 is a flowchart of an information presentation method according to an embodiment of the present disclosure. The method may be executed by an information presentation apparatus. The apparatus may be implemented in software and/or hardware and may be generally integrated into an electronic device. As shown in FIG. 1, the method is applied to a client and includes the steps described below.

S101: Collection information of at least one collection is acquired. The collection information includes title information of each collection and attribute information of multiple entities in the each collection. Attribute information of each entity matches the title information of the each collection.

The collection refers to a collection of multiple entities satisfying all the collection constituent elements. The entity may be a person, an animal, an event, and a natural phenomenon. The collection constituent element may be element information for constituting the collection, for example, a keyword in a different attribute dimension constituting the collection title. The attribute dimension may be a classification direction involved in the collection title. For example, it is assumed that the attribute dimension of the title of the collection may include height, age, gender, and occupation. The keyword of height is "above 170". The keyword of age is "post-90s". The keyword of gender is "female". The keyword of occupation is "artist". The preceding keywords of "above 170", "post-90s", "female", and "artist" under different attribute dimensions are collection constituent elements.

The collection constituent element may be input by the user or obtained based on a preset rule. The preset rule can be set according to a practical situation. In an example, the collection constituent element may be determined according to the hotspot content or the user's interactive content. In response to the collection constituent element being determined according to the hotspot content, multiple keywords may be extracted from the hotspot content, and several of the keywords are selected as the collection constituent elements. For example, assuming that the hotspot content is the Golden Horse Awards, keywords such as leading actress, leading actor, post-90s, and 28th may be extracted from images, texts, and videos related to the Golden Horse Awards as the collection constituent elements. In response to the collection constituent element being determined according to the user's interactive content, the interactive content may include content such as search information and comment information, multiple keywords may be extracted from the interactive content, and several of the keywords are selected as the collection constituent elements. For example, assuming that the user's search information is "post-90s winners of the Golden Horse Awards", the Golden Horse Awards, post-90s, and winners may be extracted from the search information as the collection constituent elements. Of course, the preceding determination method of a collection constituent element is merely an example and not an exclusive limitation.

The attribute information of each entity refers to various kinds of feature information related to each entity. For example, the attribute information of a person entity may include feature information of a person in attribute dimensions such as height, age, gender, and occupation. In this embodiment, the attribute information of each entity may include an entity name and a feature text that matches a core word in the title information of the each collection. The title information of the each collection may be obtained by clustering and screening multimedia information of each entity contained in the each collection. The core word in the title information of the collection refers to a keyword in the words obtained by segmenting the title information of the collection. The feature text matched with the core word can be understood as a specific text of each entity associated with the title information of the collection. There may be one or more feature texts. For example, the title information of the collection is "stars who graduated from famous universities", and the feature text can be "graduate university". The title information of the collection is "celebrities who left us in 2020", and the feature text can be "death time". The title information of the collection "post-90s female star that is above 170 cm" includes two feature texts of age and height.

For example, the attribute information of an entity may also include an entity tag, which is used to represent key information of the entity and may not be related to the title information of the collection. One entity may include multiple entity tags. For example, for a star entity, the entity tag may include a company founder or a starring production.

In this embodiment of the present disclosure, in response to detecting the user's preset trigger operation, collection information of at least one collection corresponding to the preset trigger operation may be acquired. In this embodiment of the present disclosure, the preset trigger operation is not limited. For example, the preset trigger operation may be a trigger operation on a collection or a search trigger operation on a search word.

S102: All or part of the collection information of the at least one collection is presented.

In this embodiment of the present disclosure, after the collection information of the at least one collection is acquired, all or part of the collection information of the preceding at least one collection may be presented on a presentation page, that is, the title information of the at least one collection and the attribute information of at least one entity contained in each collection are presented. Since each entity has information matching the collection title in the attribute information of entities, the association between an entity and the collection title is enhanced, which facilitates the user's reading.

In this embodiment of the present disclosure, presenting the all or the part of the collection information of the at least one collection includes determining a presentation scenario of the collection information, where the presentation scenario includes at least one of an encyclopedia scenario, a recommendation scenario, or a search scenario; and presenting the all or the part of the collection information of the at least one collection according to the presentation scenario. The presentation scenario may include a collection presentation scenario under an encyclopedia detail page, a collection presentation scenario for a search word, and a collection presentation scenario on a recommendation stream page. Based on the characteristics and purposes of different presentation scenarios, different collection presentation methods and contents may be configured in different presentation scenarios to achieve different presentation effects and meet the consumption demands of users for collections in different scenarios.

For example, in response to the presentation scenario being the search scenario, presenting the all or the part of the collection information of the at least one collection according to the presentation scenario includes determining, in each collection, a target entity that matches a search word; and presenting part of collection information of the each collection in the form of a collection card on a search result page. The collection card supports being slid in a preset direction. The part of the collection information of the each collection includes the title information of the collection and attribute information of the target entity.

The search scenario refers to a scenario where when a search word entered by a user includes an entity, collection information associated with the entity is presented when the entity is presented. The search result page refers to a page where the entity and the collection associated with the search word are presented. For example, in response to determining that the presentation scenario is the search scenario, attribute information of entities in each collection may be matched with the search word, and an entity whose matching degree is greater than the matching degree threshold is determined as the target entity. Then, the title information of each collection where the target entity is located and the attribute information of the target entity can be presented in the form of a collection card on the search result page. The collection card refers to a card configured on the search result page and used for presenting the collection information. Multiple collection cards can be provided. One collection card corresponds to one collection. Each collection card may be slid in a preset direction, where the preset direction may be determined according to a practical situation. For example, the preset direction may be horizontal or vertical.

For example, in response to determining that the presentation scenario is the search scenario, the title information of each collection may be matched with the search word, and the title information of each collection which matches the search word and the attribute information of a set number of entities of each collection which matches the search word are presented on the collection card on the search result page.

For example, FIG. 2 is a diagram illustrating a collection presentation according to an embodiment of the present disclosure. FIG. 2 shows a search result page with a search word "star C". The search result page shows an entity of "star C" and collections including the entity. FIG. 2 illustratively shows three collections. Each collection is presented on a collection card, including the title information of the collection and the attribute information of the entity "star C". The title information of the three collections is "Those excellent singers who graduated from famous universities", "Excellent singers who won the Golden Melody Awards", and "Singers of talent shows". The attribute information of the entity "star C" is "university A", "gold award of the Golden Melody Awards", and "show 1" under the three collections, respectively.

For example, in response to determining that the presentation scenario is the encyclopedia scenario, presenting the all or the part of the collection information of the at least one collection includes presenting the all or the part of the collection information of the at least one collection in the form of a card in a collection presentation area of an encyclopedia detail page. The collection information includes the title information of the collection and attribute information of a first preset number of entities in the collection. The first preset number of entities include a target entity corresponding to the encyclopedia scenario.

The encyclopedia scenario refers to a presentation scenario for encyclopedia knowledge. The encyclopedia detail page refers to a page for presenting encyclopedia information. For example, in response to determining that the presentation scenario is the encyclopedia scenario, a target entity corresponding to the encyclopedia scenario can be determined. When the target entity corresponding to the encyclopedia scenario is presented on the encyclopedia detail page, the all or the part of the collection information of the at least one collection is presented in the form of a card in a collection presentation area of an encyclopedia detail page. The collection presentation area refers to an area configured on the encyclopedia detail page for presenting a collection. Multiple cards may be configured in the collection presentation area. One collection card corresponds to one collection. The first preset number may be configured according to a practical situation. For example, the first preset number may be a sum of the numbers of all entities in the collection or may be the number of some entities. In response to determining that the first preset number is greater than or equal to two, that is, at least two entities are presented in the collection, the arrangement of the entities is not limited. The entities may be vertically arranged or horizontally sorted, and entities not displayed on the current interface are allowed to be viewed by sliding. Each card may be slid in a preset direction that may be determined according to a practical situation. For example, the preset direction may be horizontal or vertical.

Figure 3:
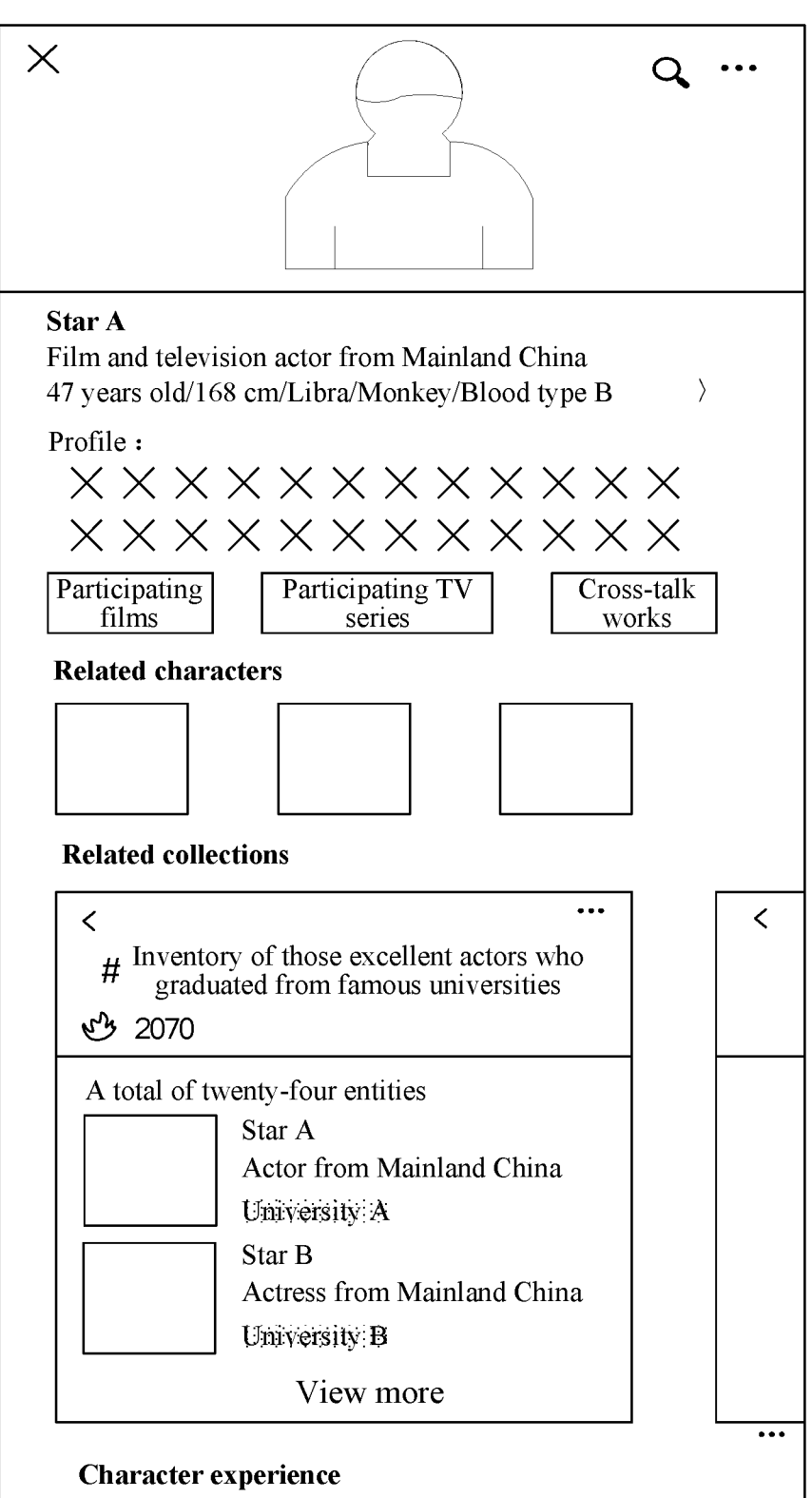
FIG. 3 is a diagram illustrating another collection presentation according to an embodiment of the present disclosure.

For example, FIG. 3 is a diagram illustrating another collection presentation according to an embodiment of the present disclosure. As shown in FIG. 3, an entity being an entry is used as an example. An encyclopedia detail page of an entry "Star A" is shown in the figure. The encyclopedia detail page shows the content of the entry and the collection information of related collections associated with the entry. The content of the entry includes a picture, personal information, a profile, participating works, related characters, character experience, and related collections of "Star A" in the figure. The participating works may include participating films, participating TV series, and cross-talk works. The related collection refers to an encyclopedia collection associated with the entry. Multiple collections may be provided. The figure illustratively shows a card of one encyclopedia collection, where the encyclopedia collection illustratively presents two entities. The card includes a collection title "Inventory of those excellent actors who graduated from famous universities" and also shows the attribute information of the two entities named "star A" and "star B". The collection includes twenty-four entities. More entities can be viewed by clicking "view more" or sliding the card. Each entity includes attribute information matching the collection title, for example, "university A" and "university B" in the figure.

For example, in response to determining that the presentation scenario is the recommendation scenario, presenting the all or the part of the collection information of the at least one collection according to the presentation scenario includes presenting part of collection information of any collection in the form of a card on a recommendation information page. The part of the collection information includes title information of the any collection and attribute information of at least one target entity in the any collection. The title information of the any collection and/or a target entity is associated with key content of recommendation information on the recommendation information page.

The recommendation information presentation scenario refers to a presentation scenario where when all collections are distributed, the collections are distributed to recommendation streams. The recommendation information page refers to a page for presenting recommendation information and a collection. For example, in response to determining that the presentation scenario is the recommendation scenario, part of collection information of any collection associated with the recommendation information in the at least one collection may be presented in the form of a card on the recommendation information page while recommendation information is presented on a recommendation information page. The part of the collection information at this time may include title information of each collection and attribute information of at least one target entity in the collection or may include only title information of the collection. The target entity refers to an entity associated with key content of the recommendation information on the recommendation information page. The collection associated with the recommendation information refers to a collection including the target entity and/or a collection corresponding to the title information of the collection associated with the key content of the recommendation information.

For example, concerning recommendation information A, target entity B associated with the key content of recommendation information A can be determined, and/or the title information of target collection C associated with the key content of recommendation information A may be determined. Part of the collection information including collections that contain target entity B and/or including target collection C is presented on the recommendation information page.

Figure 4:
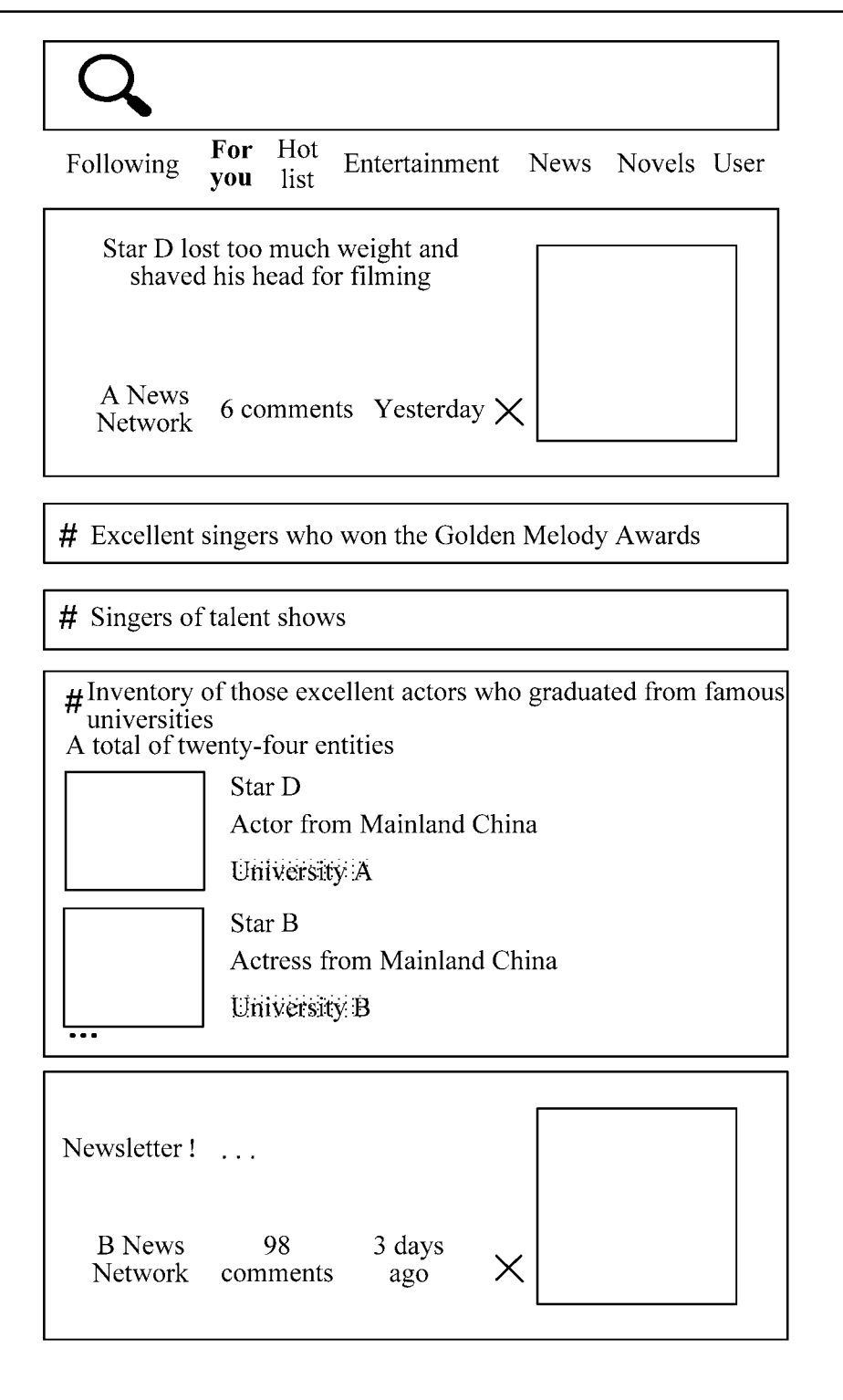
FIG. 4 is a diagram illustrating another collection presentation according to an embodiment of the present disclosure.

FIG. 4 is a diagram illustrating another collection presentation according to an embodiment of the present disclosure. The figure shows a recommendation information page whose first piece of recommendation information is information about a target entity "Star D". Then three collection cards associated with "star D" are illustratively shown. Each card presents information of one collection. The first and second cards present only the title information of the collections. The third card shows the title information of the collection and the attribute information of two entities, one of which is a target entity "star D".

In the preceding solution, according to the characteristics and purposes of different presentation scenarios, collections can be presented in different forms and contents to achieve different presentation effects and meet the consumption demands of users for collections in different scenarios. Moreover, users' demands for exploration and discovery of collections can be better met. In addition, when a collection is presented, the attribute information of each entity in the collection may also be presented, which can assist users in understanding the content of the collection and the characteristics of each entity.

In the information presentation solution provided by this embodiment of the present disclosure, collection information of at least one collection is acquired; the collection information includes title information of each collection and attribute information of multiple entities in the each collection; attribute information of each entity matches the title information of the each collection; and all or part of the collection information of the at least one collection is presented. The preceding technical solution is adopted so that the attribute information of each entity in a presented collection can be increased when the collection is presented. Since the attribute information of entities matches the title information of the collection, the association between the entities and the title of the collection is enhanced, which helps users understand the content of the collection and the characteristics of each entity and assists the users in establishing the connection between the entities in the collection more efficiently and intuitively. In this manner, the readability of the collection is improved, thereby attracting the users' clicking and improving the experience in the collection.

In some embodiments, the information presentation method may also include in response to the trigger operation on a target collection in the at least one collection, presenting title information of the target collection and attribute information of each entity in the target collection in a first presentation area of a collection detail page.

The trigger operation refers to any operation for presenting a target collection, which is not limited specifically, for example, a click operation on the target collection. A collection detail page refers to a page for presenting all relevant information about a collection. For example, in response to determining that the trigger operation of a user on preset information of a target collection of the at least one collection is detected, all the collection information of the target collection may be presented in a first presentation area of a collection detail page. All the collection information includes the title information of the target collection and the attribute information of each entity in the target collection. The preceding preset information may be configured according to a practical situation. For example, the preset information may be a collection title or a collection picture of the target collection, and the details are not limited.

Figure 5:
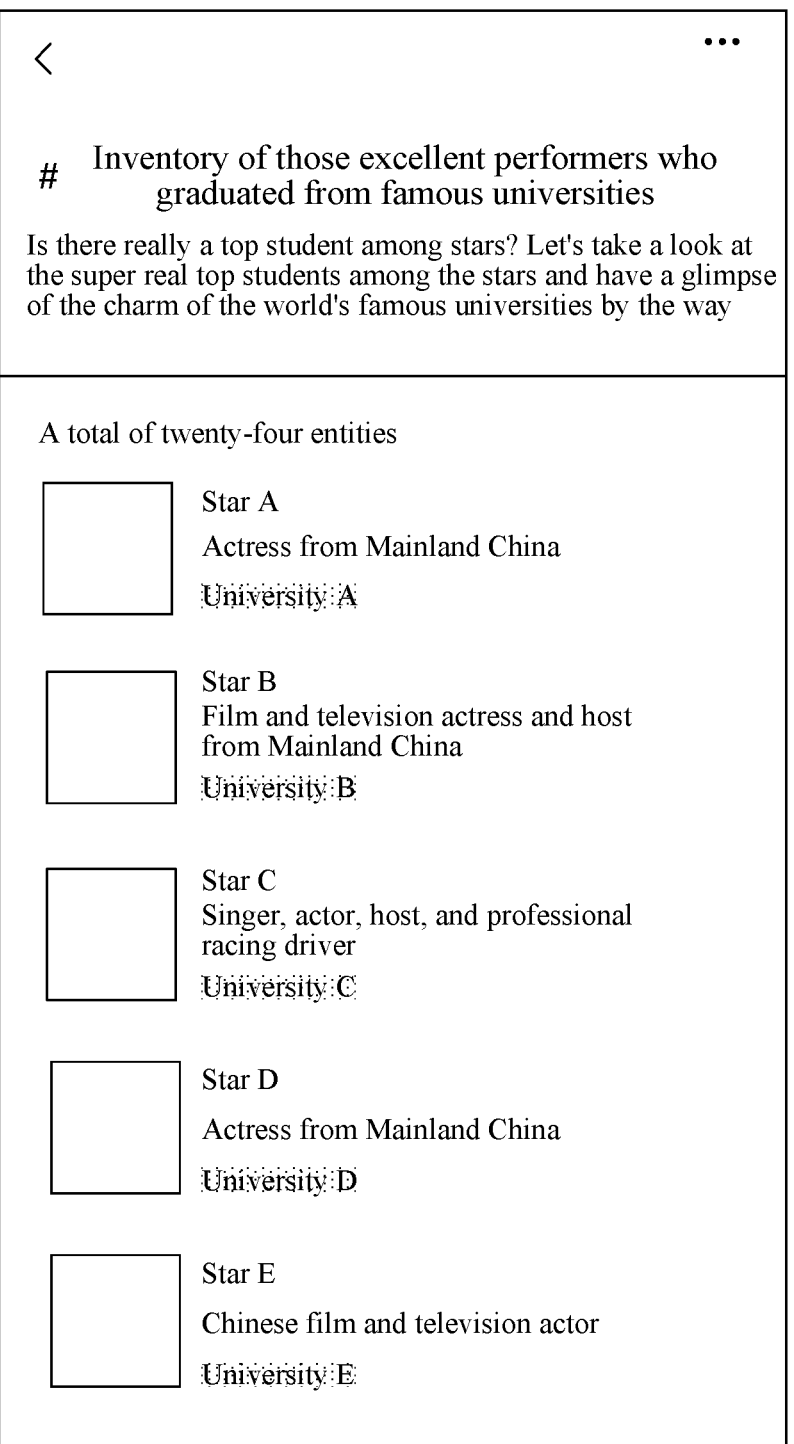
FIG. 5 is a diagram illustrating the information presentation according to an embodiment of the present disclosure.

For example, FIG. 5 is a diagram illustrating the information presentation according to an embodiment of the present disclosure. An encyclopedia collection is used as an example. FIG. 5 shows a collection detail page showing an encyclopedia collection titled "Inventory of those excellent performers who graduated from famous universities". The figure also shows profile information of the encyclopedia collection, that is, "Is there really a top student among stars? Let's take a look at the super real top students among the stars and have a glimpse of the charm of the world's famous universities by the way". In addition, the encyclopedia collection includes twenty-four entries, and 5 entries are shown in the figure as an example. Each entry includes information about one star. The attribute information corresponding to each entry is a graduation university in the figure. For example, for the first entry, the picture of star A, a profile of "actor from Mainland China", and attribute information "university A" matching the title of the collection are shown.

Since each entity in the attribute information of entities has matching information of the collection, the association between the entity and the collection title is enhanced, which facilitates the users' reading.

In some embodiments, in response to determining that multiple collections are provided, the information presentation method may also include presenting, in a second presentation area of the collection detail page, title information of another collection in the multiple collections except the target collection and/or attribute information of a second preset number of entities in the another collection.

The second presentation area, an area different from the preceding first presentation area, is configured on the collection details page. In response to determining that multiple collections are provided, collection information of another collection in the multiple collections other than the target collection may be presented in the second presentation area of the collection details page. For example, title information of another collection and/or attribute information of a second preset number of entities in the another collection may be presented. The second preset number may be determined according to a practical situation. For example, the second preset number may be all or part of the number of entities, and the details are not limited.

In the preceding solution, when the details of one collection are presented based on the trigger operation, the information of another associated collection can also be presented. In this manner, users can intuitively understand the association between different collections and can establish the association between the collections more efficiently. Moreover, the users' clicking is attracted, and the experience in the collections is improved.

Figure 6:
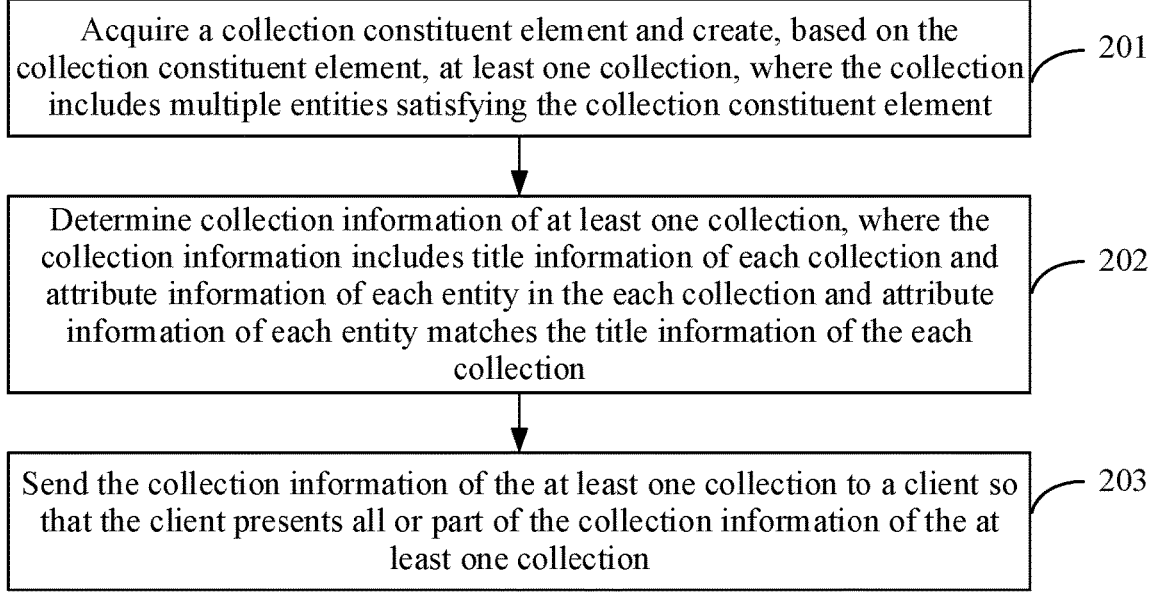
FIG. 6 is a flowchart of another information presentation method according to an embodiment of the present disclosure.

FIG. 6 is a flowchart of another information presentation method according to an embodiment of the present disclosure. The method may be executed by an information processing apparatus. The apparatus may be implemented in software and/or hardware and may be generally integrated into an electronic device. As shown in FIG. 6, the method is applied to a client or server and includes the steps described below.

S201: A collection constituent element is acquired; and based on the collection constituent element, at least one collection is created. Each collection includes multiple entities satisfying the collection constituent element.

The collection refers to a collection of multiple entities satisfying all the constituent elements. The entity may be a person, an animal, an event, and a natural phenomenon. The constituent element may be element information constituting the collection, for example, a keyword in a different attribute dimension constituting the collection title. The attribute dimension may be a classification direction involved in the collection title. The collection constituent element may be input by the user or obtained based on a preset rule. The preset rule can be set according to a practical situation. In an example, the constituent element may be determined according to the hotspot content or a user's interactive content.

In this embodiment of the present disclosure, creating, based on the collection constituent element, at least one collection may include matching the collection constituent element with key information of multiple candidate entities in an entity database; classifying multiple successfully matched target candidate entities to obtain collections of target candidate entities of multiple categories; and selecting multiple entities from collections of target candidate entities of each category separately to obtain the at least one collection.

The entity database may be a pre-established database including multiple candidate entities. The key information of the candidate entities may be information used to characterize the features of the entities, such as personal basic information and award-winning information. For example, after being acquired, the collection constituent element may be matched with the key information of multiple candidate entities in the entity database, and a candidate entity whose matching degree is greater than or equal to the set threshold is determined as a target candidate entity that is successfully matched. Multiple target candidate entities may be provided. Then the target candidate entities may be classified to obtain collections of target candidate entities of multiple categories. Multiple entities may be selected from each collection of target candidate entities and combined to obtain at least one collection. Multiple entities extracted from one collection of target candidate entities are combined to obtain one collection.

S202: Collection information of at least one collection is determined; the collection information includes title information of each collection and attribute information of multiple entities in the each collection; and attribute information of each entity matches the title information of the each collection.

The attribute information of each entity refers to various kinds of information related to content of the entity. The attribute information of each entity may include an entity name and a feature text that matches a core word in the title information of the collection.

In this embodiment of the present disclosure, the attribute information includes a feature text that matches the title information of the each collection, and determining the attribute information of the each entity in the collection information includes determining an attribute dimension included in the title information of the each collection and extracting a respective feature text of the each entity under the attribute dimension from an entity database. For example, determining the attribute dimension included in the title information of the each collection includes segmenting the title information of the each collection to obtain at least one core word, determining a target mapping word that matches the at least one core word, and determining an attribute keyword associated with the target mapping word as the attribute dimension included in the title information of the each collection.

For example, for the title information of the collection, the title of the collection may be segmented by semantic analysis to obtain at least one core word. For example, core words obtained from word segmentation of the collection title "Stars graduated from famous universities" may include "famous universities", "graduation", "graduated from famous universities", and "stars". Then, a target mapping word that matches the core words may be determined. Since the target mapping word is associated with an attribute keyword, the attribute keyword is an attribute dimension included in the title information of the collection. The attribute keyword is the key of the classification attribute. One attribute keyword may be associated with at least one mapping word. For example, the attribute keyword is "graduation university", and the associated mapping word may include "graduation university", "graduated from famous universities," and "graduated from".

For example, determining the target mapping word that matches the at least one core word includes determining similarity between each core word and multiple mapping words in a mapping thesaurus and determining a mapping word whose similarity is greater than the similarity threshold as the target mapping word. The mapping thesaurus refers to a pre-established thesaurus including multiple mapping words. Each mapping word may be associated with multiple mapping words with similar semantics.

For example, after the core word is obtained by segmenting the title information of the collection, the core word may be matched with each mapping word in the mapping thesaurus, the similarity is calculated, and a mapping word whose similarity is greater than the similarity threshold is determined as the preceding target mapping word. The preceding similarity threshold may be set according to a practical situation.

For example, extracting the respective feature text of the each entity under the attribute dimension from the entity database includes searching, according to the attribute dimension and a respective entity identifier of the each entity, the entity database to determine a respective attribute value corresponding to the each entity, and determining the respective attribute value corresponding to the each entity as the respective feature text of the each entity under the attribute dimension. The entity database may be a pre-established database for storing basic entity information of different types, which may store a large amount of basic data.

For example, after the attribute dimension included in the title information of the collection is determined, the corresponding attribute value, that is, the value of the classification attribute, can be pulled from the entity database according to the attribute dimension included in the title information of the collection and the entity identifier of each entity, and the corresponding attribute value is determined as the respective feature text of each entity under the attribute dimension. The entity identifier may be a unique identifier representing an entity. For example, the entity identifier may be represented by a number and/or a letter. Various kinds of information related to the entity may be acquired via the entity identifier.

In the preceding solution, according to the attribute dimension corresponding to the title information of the collection, the feature text that matches the title information of the collection in the attribute information of each entity can be determined. The key content extension information is added to the entity, improving the readability.

Figure 7:
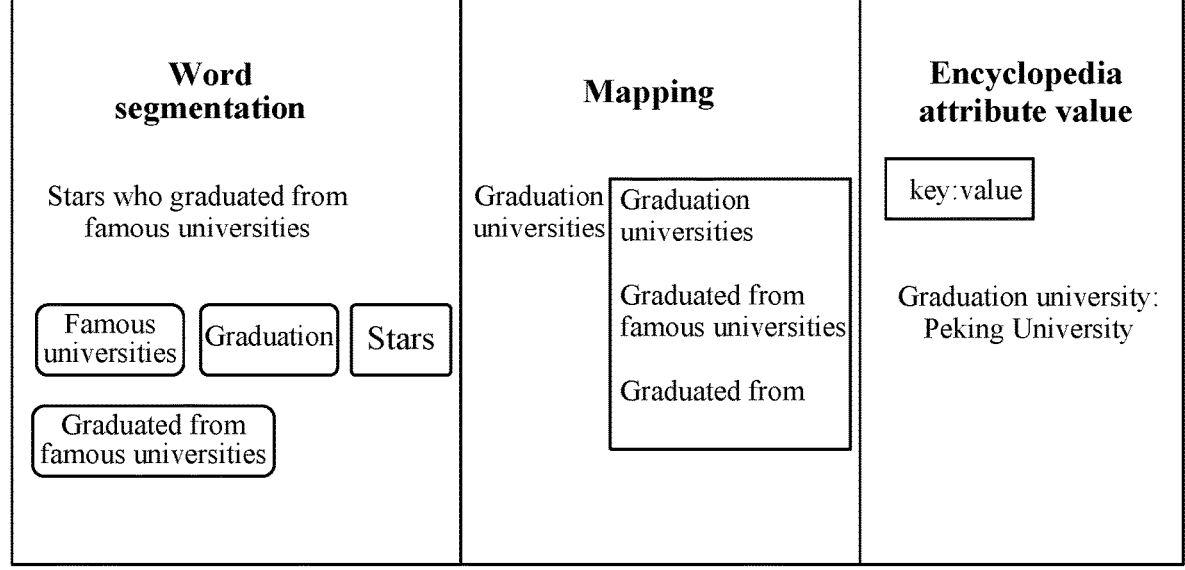
FIG. 7 is a diagram illustrating determination of a feature text according to an embodiment of the present disclosure.

For example, FIG. 7 is a diagram in which a feature text is determined according to an embodiment of the present disclosure. In the figure, an encyclopedia collection titled "Stars graduated from famous universities" is used as an example for description. As shown in FIG. 7, the process of determining a feature text may include the steps described below. S1. The title of the collection is segmented. The title of the collection "stars who graduated from famous universities" is segmented to obtain four core words, that is, "famous universities", "graduation", "graduated from famous universities", and "stars". S2. The word segmentation result is mapped. According to the word segmentation result, the existing model is called to determine a mapping word. For example, the target mapping word of the core word "graduated from famous universities" may be "graduation university". S3. The mapped field is matched with encyclopedia classification attribute dimensions. The attribute key associated with the target mapping word is matched in the encyclopedia classification attribute database. For example, the target mapping word corresponding to the core word "graduated from famous universities" is "graduation university", and the encyclopedia classification attribute key associated with "graduation university" is "graduation university". S4. The encyclopedia classification attribute value is acquired for an entry in the collection. According to the finally associated encyclopedia classification attribute key, the corresponding encyclopedia classification attribute value is pulled from the encyclopedia database for each entry in the encyclopedia collection. For example, for one entry in FIG. 5, the key is "graduate university", and the pulled value is "university A". The encyclopedia classification attribute key is determined as the attribute dimension included in the title information of the collection. The encyclopedia classification attribute value is determined as the feature text that matches the title information of the collection and is presented on the encyclopedia collection detail page when the collection is presented, as shown in FIGS. 2 to 5.

In this embodiment of the present disclosure, determining the title information of the collection includes clustering and screening multimedia information of the each entity in the each collection, determining a respective category keyword of each category, and determining the title information of the each collection according to the respective category keyword. The multimedia information of an entity refers to various types of information corresponding to the entity, such as encyclopedia, pictures, text, and video, and the details are not limited.

For example, on the basis of the created collection, the multimedia information of each entity contained in the collection may be clustered and screened to obtain entity collections of multiple categories, and then a keyword with the largest number under the entity collections of multiple categories may be determined as a category keyword, and the title information of the collection may be determined according to multiple category keywords.

S203: The collection information of the at least one collection is sent to a client so that the client presents all or part of the collection information of the at least one collection.

For example, after at least one collection is created and collection information of the at least one collection is determined, the collection information may be sent to a client when needed by the client so that the client presents all or part of the collection information of the at least one collection according to different presentation scenarios. The presentation scenario includes at least one of an encyclopedia scenario, a recommendation scenario, or a search scenario. The specific presentation strategy is described in the preceding embodiments and is not repeated herein.

In the information presentation solution provided by this embodiment of the present disclosure, a collection constituent element is acquired; at least one collection is created based on the collection constituent element; each collection includes multiple entities satisfying the collection constituent element; collection information of at least one collection is determined; the collection information includes title information of the collection and attribute information of each entity in the collection; attribute information of the each entity matches the title information of the collection; and the collection information of the at least one collection is sent to a client so that the client presents all or part of the collection information of the at least one collection. The preceding technical solution is adopted so that a collection can be created according to a collection constituent element, collection information of the collection can be determined, and the collection information of the collection is sent to a client for presentation. Since the attribute information of an entity in the collection information matches the title information of the collection, the association between the entity and the title of the collection is enhanced, which helps users understand the content of the collection and the characteristics of each entity and assists the users in establishing the connection between the entities in the collection more efficiently. In this manner, the readability of the collection is improved, thereby attracting the users' clicking and improving the experience in the collection.

Figure 8:
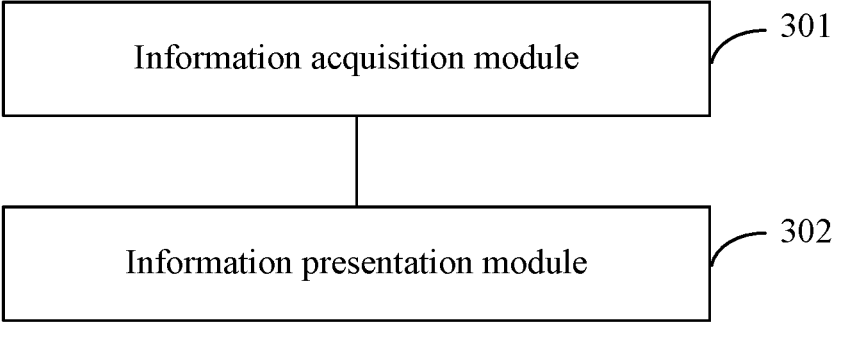
FIG. 8 is a diagram illustrating the structure of an information presentation apparatus according to an embodiment of the present disclosure.

FIG. 8 is a diagram illustrating the structure of an information presentation apparatus according to an embodiment of the present disclosure. The apparatus may be implemented in software and/or hardware and may be generally integrated into an electronic device. As shown in FIG. 8, the apparatus includes an information acquisition module 301 and an information presentation module 302.

The information acquisition module 301 is configured to acquire collection information of at least one collection. The collection information includes title information of each collection and attribute information of multiple entities in the each collection. Attribute information of each entity matches the title information of the each collection.

The information presentation module 302 is configured to present all or part of the collection information of the at least one collection.

For example, the information presentation module 302 is configured to determine a presentation scenario of the collection information, where the presentation scenario includes at least one of an encyclopedia scenario, a recommendation scenario, or a search scenario; and present the all or the part of the collection information of the at least one collection according to the presentation scenario.

For example, the attribute information of each entity includes an entity name and a feature text that matches a core word in the title information of the each collection.

For example, in response to determining that the presentation scenario is the search scenario, the information presentation module 302 is configured to determine, in each collection, a target entity that matches a search word; and present part of collection information of the each collection in the form of a collection card on a search result page. The collection card supports being slid in a preset direction. The part of the collection information of the each collection includes the title information of the collection and attribute information of the target entity.

For example, in response to determining that the presentation scenario is the encyclopedia scenario, the information presentation module 302 is configured to present the all or the part of the collection information of the at least one collection in the form of a card in a collection presentation area of an encyclopedia detail page. The collection information includes the title information of the collection and attribute information of a first preset number of entities in the collection. The first preset number of entities include a target entity corresponding to the encyclopedia scenario.

For example, in response to determining that the presentation scenario is the recommendation scenario, the information presentation module 302 is configured to present part of collection information of any collection in the form of a card on a recommendation information page. The part of the collection information includes title information of the any collection and attribute information of at least one target entity in the any collection. The title information of the any collection and/or a target entity is associated with key content of recommendation information on the recommendation information page.

For example, the apparatus also includes a collection detail presentation module. The module is configured to in response to the trigger operation on a target collection in the at least one collection, present title information of the target collection and attribute information of each entity in the target collection in a first presentation area of a collection detail page.

For example, in response to determining that multiple collections are provided, the collection detail presentation module is configured to present, in a second presentation area of the collection detail page, title information of another collection in the multiple collections except the target collection or attribute information of a second preset number of entities in the another collection.

The information presentation apparatus provided by the embodiments of the present disclosure can execute the information presentation method executed by a client and provided by any embodiment of the present disclosure and has corresponding functional modules and beneficial effects of executing the method.

Figure 9:
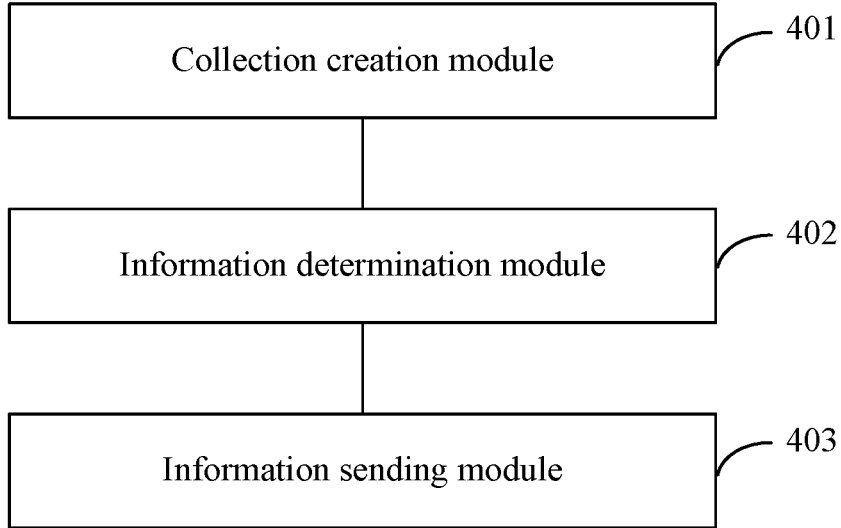
FIG. 9 is a diagram illustrating the structure of another information presentation apparatus according to an embodiment of the present disclosure.

FIG. 9 is a diagram illustrating the structure of another information presentation apparatus according to an embodiment of the present disclosure. The apparatus may be implemented in software and/or hardware and may be generally integrated into an electronic device. As shown in FIG. 9, the apparatus includes a collection creation module 401, an information determination module 402, and an information sending module 403.

The collection creation module 401 is configured to acquire a collection constituent element and create, based on the collection constituent element, at least one collection. Each collection includes multiple entities satisfying the collection constituent element.

The information determination module 402 is configured to determine collection information of the at least one collection. The collection information includes title information of each collection and attribute information of each entity in the each collection. The attribute information of the each entity matches the title information of the each collection.

The information sending module 403 is configured to send the collection information of the at least one collection to a client so that the client presents all or part of the collection information of the at least one collection.

For example, the attribute information includes a feature text that matches the title information of the each collection. The information determination module 402 includes an attribute dimension unit and a text determination unit.

The attribute dimension unit is configured to determine an attribute dimension included in the title information of the each collection.

The text determination unit is configured to extract a respective feature text of the each entity under the attribute dimension from an entity database.

For example, the attribute dimension unit is configured to segment the title information of the collection to obtain at least one core word, determine a target mapping word that matches the at least one core word, and determine an attribute keyword associated with the target mapping word as the attribute dimension included in the title information of the collection.

For example, the attribute dimension unit is configured to determine the similarity between each core word and multiple mapping words in a mapping thesaurus and determine a mapping word whose similarity is greater than the similarity threshold as the target mapping word.

For example, the text determination unite is configured to search, according to the attribute dimension and a respective entity identifier of the each entity, the entity database, determine a respective attribute value corresponding to the each entity, and determine the respective attribute value corresponding to the each entity as the respective feature text of the each entity under the attribute dimension.

For example, the collection creation module 401 is configured to match the collection constituent element with key information of multiple candidate entities in an entity database, classify multiple successfully matched target candidate entities to obtain collections of target candidate entities of multiple categories, and select multiple entities from collections of target candidate entities of each category separately to obtain the at least one collection.

For example, the information determination module 402 includes clustering and screening multimedia information of the each entity in the each collection, determining a respective category keyword of the each category, and determining, according to the respective category keyword, the title information of the each collection.

The information presentation apparatus provided by the embodiments of the present disclosure can execute the information presentation method executed by a client or a server and provided by any embodiment of the present disclosure and has corresponding functional modules and beneficial effects of executing the method.

Embodiments of the present disclosure also provide a computer program product, including a computer program/ instruction that, when executed by a processor, implements the information presentation method provided by any embodiment of the disclosure.

Figure 10:
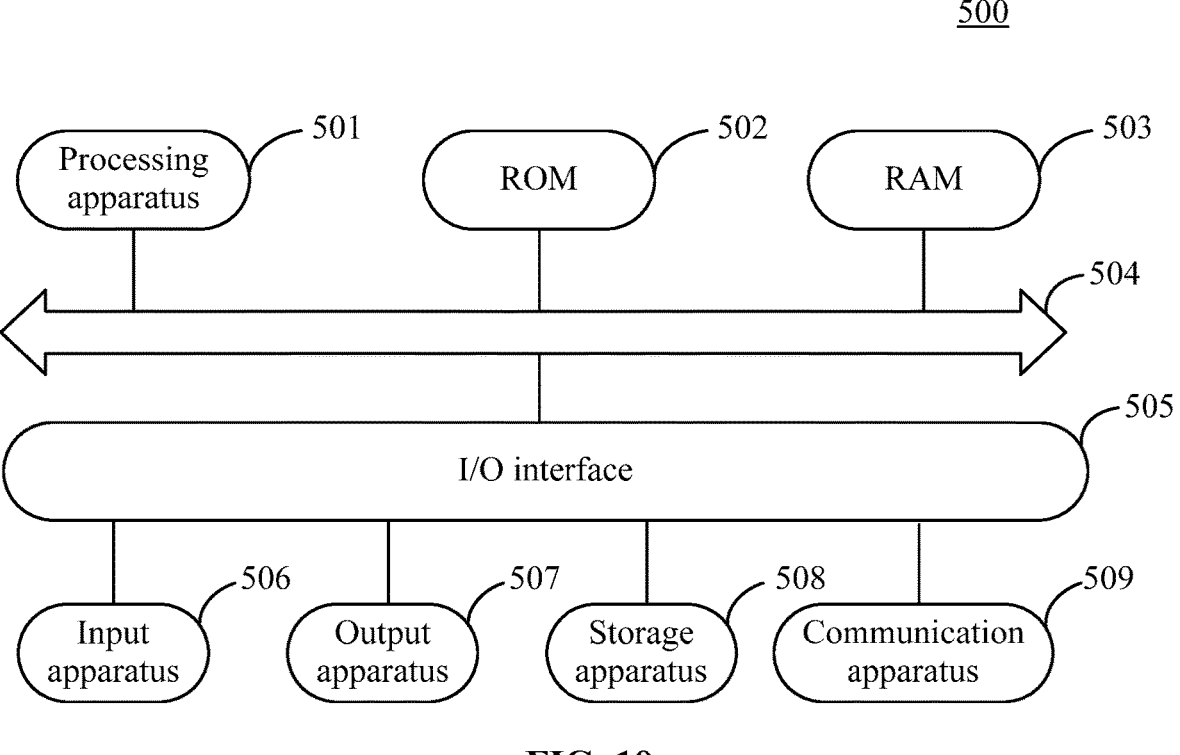
FIG. 10 is a diagram illustrating the structure of an electronic device according to an embodiment of the present disclosure.

FIG. 10 is a diagram illustrating the structure of an electronic device according to an embodiment of the present disclosure. Referring to FIG. 10, FIG. 10 is a diagram illustrating the structure of an electronic device 500 applicable to implementing the embodiments of the present disclosure. The electronic device 500 in the embodiments of the present disclosure may include but is not limited to, a mobile terminal such as a mobile phone, a laptop, a digital broadcast receiver, a personal digital assistant (PDA), a PAD, a portable media player (PMP), and a vehicle-mounted terminal (for example, a vehicle-mounted navigation terminal) and a fixed terminal such as a digital TV and a desktop computer. The electronic device shown in FIG. 10 is merely an example and should not impose any limitation to the function and usage scope of embodiments of the present disclosure.

As shown in FIG. 10, the electronic device 500 may include a processing apparatus 501 (such as a central processing unit or a graphics processor). The processing apparatus 501 may perform various appropriate actions and processing according to a program stored in a read-only memory (ROM) 502 or a program loaded into a random access memory (RAM) 503 from a storage apparatus 508. The RAM 503 also stores various programs and data required for the operation of the electronic device 500. The processing apparatus 501, the ROM 502, and the RAM 503 are connected to each other through a bus 504. An input/output (I/O) interface 505 is also connected to the bus 504.

Generally, the following apparatus may be connected to the I/O interface 505: an input apparatus 506 such as a touch screen, a touch pad, a keyboard, a mouse, a camera, a microphone, an accelerometer, and a gyroscope; an output apparatus 507 such as a liquid crystal display (LCD), a speaker, and a vibrator; a storage apparatus 508 such as a magnetic tape and a hard disk; and a communication apparatus 509. The communication apparatus 509 may allow the electronic device 500 to perform wireless or wired communication with other devices to exchange data. FIG. 10 shows the electronic device 500 having various apparatuses, but it should be understood that it is not necessary to implement or be equipped with all the shown apparatuses. Alternatively, the electronic device 500 may implement or be equipped with more or fewer apparatuses.

According to this embodiment of the present disclosure, the process described above with reference to the flowchart may be implemented as a computer software program. For example, this embodiment of the present disclosure includes a computer program product. The computer program product includes a computer program carried in a non-transitory computer-readable medium. The computer program includes program codes for performing the method shown in the flowchart. In such an embodiment, the computer program may be downloaded and installed from the network through the communication apparatus 509, or may be installed from the storage apparatus 508, or may be installed from the ROM 502. When the computer program is executed by the processing apparatus 501, the preceding functions defined in the information presentation method of the embodiments of the present disclosure are performed.

It is to be noted that the preceding computer-readable medium of the present disclosure may be a computer-readable signal medium, a computer-readable storage medium, or any combination of the computer-readable signal medium and the computer-readable storage medium. The computer-readable storage medium may be, but is not limited to, an electrical, magnetic, optical, electromagnetic, infrared, or semiconductor system, apparatus, or device, or any combination thereof. Examples of the computer-readable storage medium may include, but are not limited to, an electrical connection with one or more wires, a portable computer disk, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any appropriate combination thereof. In the present disclosure, the computer-readable storage medium may be any tangible medium including or storing a program. The program may be used by or used in conjunction with an instruction execution system, apparatus, or device. In the present disclosure, the computer-readable signal medium may include a data signal propagated on a base band or as a part of a carrier wave. Computer-readable program codes are carried in the data signal. Such propagated data signals may take a variety of forms, including, but not limited to, electromagnetic signals, optical signals, or any suitable combination thereof. The computer-readable signal medium may also be any computer-readable medium other than a computer-readable storage medium. The computer-readable signal medium may send, propagate, or transmit a program used by or in conjunction with an instruction execution system, apparatus, or device. The program codes contained on the computer-readable medium may be transmitted on any suitable medium, including, but not limited to, a wire, an optical cable, radio frequency (RF), or any suitable combination thereof.

In some embodiments, the client and the server can communicate by using any currently known or future-developed network protocol such as HyperText Transfer Protocol (HTTP) and can be interconnected by any form or medium of digital data communication (for example, a communication network). Examples of the communication network include a local area network (LAN), a wide area network (WAN), an interconnected network (for example, the Internet), an end-to-end network (for example, an ad hoc end-to-end network), and any currently known or future-developed network.

The preceding computer-readable medium may be included in the preceding electronic device or may exist alone without being assembled into the electronic device.

The preceding computer-readable medium carries one or more programs. When executing the one or more programs, the electronic device performs the steps described below. Collection information of at least one collection is acquired. The collection information includes title information of each collection and attribute information of multiple entities in the each collection. Attribute information of each entity matches the title information of the each collection. All or part of the collection information of the at least one collection is presented.

Alternatively, the preceding computer-readable medium carries one or more programs. When executing the one or more programs, the electronic device performs the steps described below. A collection constituent element is acquired. Based on the collection constituent element, at least one collection is created. Each collection includes multiple entities satisfying the collection constituent element. Collection information of at least one collection is determined. The collection information includes title information of the collection and attribute information of each entity in the each collection. Attribute information of the each entity matches the title information of the each collection. The collection information of the at least one collection is sent to a client so that the client presents all or part of the collection information of the at least one collection.

Computer program codes for performing the operations in the present disclosure may be written in one or more programming languages or a combination thereof. The preceding one or more programming languages include but are not limited to object-oriented programming languages such as Java, Smalltalk, and C++, as well as conventional procedural programming languages such as "C" or similar programming languages. The program codes may be executed entirely on a user computer, partly on a user computer, as a stand-alone software package, partly on a user computer and partly on a remote computer, or entirely on a remote computer or a server. In the case relating to a remote computer, the remote computer may be connected to a user computer via any kind of network including a local area network (LAN) or a wide area network (WAN), or may be connected to an external computer (for example, via the Internet by an Internet service provider).

The flowcharts and block diagrams in the drawings show possible architectures, functions, and operations of the system, method, and computer program product according to the multiple embodiments of the present disclosure. In this regard, each block in the flowcharts or block diagrams may represent a module, a program segment, or part of codes that include one or more executable instructions for implementing specified logical functions. It is also to be noted that in some alternative implementations, the functions noted in the blocks may take an order different from the order noted in the drawings. For example, two sequential blocks may, in fact, be executed substantially in parallel, or sometimes executed in the reverse order, which depends on the involved functions. It is also to be noted that each block of the block diagrams and/or flowcharts and combinations of blocks in the block diagrams and/or flowcharts may be implemented by not only a specific-purpose hardware-based system that performs a specified function or action, but also a combination of specific-purpose hardware and computer instructions.

The described units involved in the embodiments of the present disclosure may be implemented by software or hardware. The name of a unit is not intended to limit the unit in some cases.

The functions described herein above may be performed at least in part by one or more hardware logic components. For example, without limitation, exemplary types of hardware logic components that may be used include Field Programmable Gate Array (FPGA), Application Specific Integrated Circuit (ASIC), Application Specific Standard Product (ASSP), System on Chips (SOC), and Complex Programmable Logical device (CPLD).

In the context of the present disclosure, a machine-readable medium may be a tangible medium that may contain or store a computer program for use by or in conjunction with an instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination thereof. Examples of the machine-readable storage medium may include an electrical connection based on one or more wires, a portable computer disk, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any appropriate combination thereof.

According to one or more embodiments of the present disclosure, the present disclosure provides an information presentation method. The method includes the steps described below.

Collection information of at least one collection is acquired. The collection information includes title information of each collection and attribute information of multiple entities in the each collection. Attribute information of each entity matches the title information of the each collection.

All or part of the collection information of the at least one collection is presented.

According to one or more embodiments of the present disclosure, in the information presentation method provided by the present disclosure, presenting the all or the part of the collection information of the at least one collection includes determining a presentation scenario of the collection information, where the presentation scenario includes at least one of an encyclopedia scenario, a recommendation scenario, or a search scenario; and presenting the all or the part of the collection information of the at least one collection according to the presentation scenario.

According to one or more embodiments of the present disclosure, in the information presentation method provided by the present disclosure, the attribute information of each entity includes an entity name and a feature text that matches a core word in the title information of the collection.

According to one or more embodiments of the present disclosure, in the information presentation method provided by the present disclosure, in response to determining that the presentation scenario is the search scenario, presenting the all or the part of the collection information of the at least one collection according to the presentation scenario includes determining, in each collection, a target entity that matches a search word; and presenting part of collection information of the each collection in the form of a collection card on a search result page. The collection card supports being slid in a preset direction. The part of the collection information of the each collection includes the title information of the collection and attribute information of the target entity.

According to one or more embodiments of the present disclosure, in the information presentation method provided by the present disclosure, in response to determining that the presentation scenario is the encyclopedia scenario, presenting the all or the part of the collection information of the at least one collection according to the presentation scenario includes presenting the all or the part of the collection information of the at least one collection in the form of a card in a collection presentation area of an encyclopedia detail page. The collection information includes the title information of the collection and attribute information of a first preset number of entities in the collection. The first preset number of entities include a target entity corresponding to the encyclopedia scenario.

According to one or more embodiments of the present disclosure, in the information presentation method provided by the present disclosure, in response to determining that the presentation scenario is the recommendation scenario, presenting the all or the part of the collection information of the at least one collection according to the presentation scenario includes presenting part of collection information of any collection in the form of a card on a recommendation information page. The part of the collection information includes title information of the any collection and attribute information of at least one target entity in the any collection. At least one of the title information of the any collection or a target entity is associated with key content of recommendation information on the recommendation information page.

According to one or more embodiments of the present disclosure, the information presentation method provided by the present disclosure also includes in response to the trigger operation on a target collection in the at least one collection, presenting title information of the target collection and attribute information of each entity in the target collection in a first presentation area of a collection detail page.

According to one or more embodiments of the present disclosure, in the information presentation method provided by the present disclosure, in response to determining that multiple collections are provided, the method also induces presenting, in a second presentation area of the collection detail page, at least one of title information of another collection in the multiple collections except the target collection or attribute information of a second preset number of entities in the another collection.

According to one or more embodiments of the present disclosure, the present disclosure provides an information presentation method. The method includes the steps described below.

A collection constituent element is acquired. Based on the collection constituent element, at least one collection is created. Each collection includes multiple entities satisfying the collection constituent element.

Collection information of the at least one collection is determined. The collection information includes title information of each collection and attribute information of each entity in the each collection. The attribute information of the each entity matches the title information of the each collection.

The collection information of the at least one collection is sent to a client so that the client presents all or part of the collection information of the at least one collection.

According to one or more embodiments of the present disclosure, in the information presentation method provided by the present disclosure, the attribute information includes a feature text that matches the title information of the each collection, and determining the attribute information of the each entity in the each collection information includes determining an attribute dimension included in the title information of the each collection and extracting a respective feature text of the each entity under the attribute dimension from an entity database.

According to one or more embodiments of the present disclosure, in the information presentation method provided by the present disclosure, determining the attribute dimension included in the title information of the each collection includes segmenting the title information of the each collection to obtain at least one core word, determining a target mapping word that matches the at least one core word, and determining an attribute keyword associated with the target mapping word as the attribute dimension included in the title information of the each collection.

According to one or more embodiments of the present disclosure, in the information presentation method provided by the present disclosure, determining the target mapping word that matches the at least one core word includes determining the similarity between each core word and multiple mapping words in a mapping thesaurus and determining a mapping word whose similarity is greater than the similarity threshold as the target mapping word.

According to one or more embodiments of the present disclosure, in the information presentation method provided by the present disclosure, extracting the respective feature text of the each entity under the attribute dimension from the entity database includes searching, according to the attribute dimension and a respective entity identifier of the each entity, the entity database to determine a respective attribute value corresponding to the each entity, and determining the respective attribute value corresponding to the each entity as the respective feature text of the each entity under the attribute dimension.

According to one or more embodiments of the present disclosure, in the information presentation method provided by the present disclosure, creating, based on the collection constituent element, the at least one collection includes matching the collection constituent element with key information of multiple candidate entities in an entity database, classifying multiple successfully matched target candidate entities to obtain collections of target candidate entities of multiple categories, and selecting multiple entities from collections of target candidate entities of each category separately to obtain the at least one collection.

According to one or more embodiments of the present disclosure, in the information presentation method provided by the present disclosure, determining the title information of the collection includes clustering and screening multimedia information of the each entity in the each collection, determining a respective category keyword in the collections of target candidate entities of the each category, and determining, according to the respective category keyword, the title information of the each collection.

According to one or more embodiments of the present disclosure, the present disclosure provides an information presentation apparatus. The apparatus includes an information acquisition module and an information presentation module.

The information acquisition module is configured to acquire collection information of at least one collection. The collection information includes title information of each collection and attribute information of multiple entities in the each collection. Attribute information of each entity matches the title information of the each collection.

The information presentation module is configured to present all or part of the collection information of the at least one collection.

According to one or more embodiments of the present disclosure, in the information presentation apparatus provided by the present disclosure, the information presentation module is configured to determine a presentation scenario of the collection information, where the presentation scenario includes at least one of an encyclopedia scenario, a recommendation scenario, or a search scenario; and present the all or the part of the collection information of the at least one collection according to the presentation scenario.

According to one or more embodiments of the present disclosure, in the information presentation apparatus provided by the present disclosure, the attribute information of each entity includes an entity name and a feature text that matches a core word in the title information of the collection.

According to one or more embodiments of the present disclosure, in the information presentation apparatus provided by the present disclosure, in response to determining that the presentation scenario is the search scenario, the information presentation module is configured to determine, in each collection, a target entity that matches a search word; and present part of collection information of the each collection in the form of a collection card on a search result page. The collection card supports being slid in a preset direction. The part of the collection information of the each collection includes the title information of the collection and attribute information of the target entity.

According to one or more embodiments of the present disclosure, in the information presentation apparatus provided by the present disclosure, in response to determining that the presentation scenario is the encyclopedia scenario, the information presentation module is configured to present the all or the part of the collection information of the at least one collection in the form of a card in a collection presentation area of an encyclopedia detail page. The collection information includes the title information of the collection and attribute information of a first preset number of entities in the collection. The first preset number of entities include a target entity corresponding to the encyclopedia scenario.

According to one or more embodiments of the present disclosure, in the information presentation apparatus provided by the present disclosure, in response to determining that the presentation scenario is the recommendation scenario, the information presentation module is configured to present part of collection information of any collection in the form of a card on a recommendation information page. The part of the collection information includes title information of the any collection and attribute information of at least one target entity in the any collection. At least one of the title information of the any collection and a target entity is associated with key content of recommendation information on the recommendation information page.

According to one or more embodiments of the present disclosure, in the information presentation apparatus provided by the present disclosure, the information presentation also includes a collection detail presentation module configured to in response to the trigger operation on a target collection in the at least one collection, present title information of the target collection and attribute information of each entity in the target collection in a first presentation area of a collection detail page.

According to one or more embodiments of the present disclosure, in the information presentation apparatus provided by the present disclosure, in response to determining that multiple collections are provided, the collection detail presentation module is configured to present, in a second presentation area of the collection detail page, at least one of title information of another collection in the multiple collections except the target collection or attribute information of a second preset number of entities in the another collection.

According to one or more embodiments of the present disclosure, the present disclosure provides an information presentation apparatus. The apparatus includes a collection creation module, an information determination module, and an information sending module.

The collection creation module is configured to acquire a collection constituent element and create, based on the collection constituent element, at least one collection. Each collection includes multiple entities satisfying the collection constituent element.

The information determination module is configured to determine collection information of the at least one collection. The collection information includes title information of each collection and attribute information of each entity in the collection. The attribute information of the each entity matches the title information of the each collection.

The information sending module is configured to send the collection information of the at least one collection to a client so that the client presents all or part of the collection information of the at least one collection.

According to one or more embodiments of the present disclosure, in the information presentation apparatus provided by the present disclosure, the attribute information includes a feature text that matches the title information of the collection, and the information determination module includes an attribute dimension unit and a text determination unit.

The attribute dimension unit is configured to determine an attribute dimension included in the title information of the collection.

The text determination unit is configured to extract a respective feature text of the each entity under the attribute dimension from an entity database.

According to one or more embodiments of the present disclosure, in the information presentation apparatus provided by the present disclosure, the attribute dimension unit is configured to segment the title information of the collection to obtain at least one core word, determine a target mapping word that matches the at least one core word, and determine an attribute keyword associated with the target mapping word as the attribute dimension included in the title information of the collection.

According to one or more embodiments of the present disclosure, in the information presentation apparatus provided by the present disclosure, the attribute dimension unit is configured to determine the similarity between each core word and multiple mapping words in a mapping thesaurus and determine a mapping word whose similarity is greater than the similarity threshold as the target mapping word.

According to one or more embodiments of the present disclosure, in the information presentation apparatus provided by the present disclosure, the text determination unit is configured to search, according to the attribute dimension and a respective entity identifier of the each entity, the entity database, determine a respective attribute value corresponding to the each entity, and determine the respective attribute value corresponding to the each entity as the respective feature text of the each entity under the attribute dimension.

According to one or more embodiments of the present disclosure, in the information presentation apparatus provided by the present disclosure, the collection creation module is configured to match the collection constituent element with key information of multiple candidate entities in an entity database, classify multiple successfully matched target candidate entities to obtain collections of target candidate entities of multiple categories, and select multiple entities from collections of target candidate entities of each category separately to obtain the at least one collection.

According to one or more embodiments of the present disclosure, in the information presentation apparatus provided by the present disclosure, the information determination module includes clustering and screening multimedia information of the each entity in the each collection, determining a respective category keyword in the collections of target candidate entities of the each category, and determining, according to the respective category keyword, the title information of the each collection.

According to one or more embodiments of the present disclosure, the present disclosure provides an electronic device. The device includes one or more processors and a memory.

The memory is configured to store instructions executable by the processor.

The processor is configured to read the executable instructions from the memory and execute the instructions to implement the information presentation method provided by any embodiment of the present disclosure.

According to one or more embodiments of the present disclosure, the present disclosure provides a computer-readable storage medium, which stores a computer program configured to execute the information presentation method provided by any embodiment of the present disclosure.

The preceding descriptions are only example embodiments of the present disclosure and the technical principles used therein. Those skilled in the art should understand that the disclosure scope involved in this disclosure is not limited to the technical solution formed by the specific combination of the preceding technical features, but covers, without departing from the preceding disclosed concepts, other technical solutions formed by any combination of the preceding technical features or their equivalent features, for example, a technical solution formed by replacing the preceding features with technical features with similar functions disclosed in (but not limited to) this disclosure.

Additionally, although multiple operations are described in a particular order, it is not a must to perform these operations in this particular order or in sequential order. In a certain environment, multitasking and parallel processing may be advantageous. Similarly, although multiple implementation details are included in the preceding discussion, these should not be construed as limiting the scope of the present disclosure. Some features described in the context of separate embodiments may be implemented in combination in a single embodiment. Rather, features described in the context of a single embodiment may be implemented in multiple embodiments individually or in any suitable sub-combination.

What is claimed is:

1. An information presentation method, applied to a client, comprising:

in response to detecting a preset trigger operation of a user, acquiring collection information of at least one collection corresponding to the preset trigger operation, wherein the collection information comprises title information of each collection of the at least one collection and attribute information of a plurality of entities in the each collection, the title information of the each collection comprises keywords under different attribute dimensions, attribute information of each entity of the plurality of entities matches the title information of the each collection, and the attribute information of each entity comprises an entity name and a feature text that matches a keyword of the keywords under the different attribute dimensions in the title information of a respective one of the at least one collection; and presenting all or part of the collection information of the at least one collection;

wherein presenting the all or the part of the collection information of the at least one collection comprises: determining a presentation scenario of the collection information, wherein the presentation scenario comprises at least one of an encyclopedia scenario, a recommendation scenario, or a search scenario; and presenting the all or the part of the collection information of the at least one collection according to the presentation scenario; and wherein in response to determining that the presentation scenario is the encyclopedia scenario, presenting the all or the part of the collection information of the at least one collection according to the presentation scenario comprises:

presenting the all or the part of the collection information of the at least one collection in a form of a card in a collection presentation area of an encyclopedia detail page, wherein the collection information comprises the title information of the each collection and attribute information of a first preset number of entities in the each collection, and the first preset number of entities comprise a target entity corresponding to the encyclopedia scenario.

2. The method of claim 1, wherein the feature text matches a core word in the title information of the each collection.

3. The method of claim 1, wherein in response to determining that the presentation scenario is the search scenario, presenting the all or the part of the collection information of the at least one collection according to the presentation scenario comprises:

determining, in each collection of the at least one collection, a target entity that matches a search word; and presenting part of collection information of the each collection in a form of a collection card on a search result page; wherein the collection card supports being slid in a preset direction, and the part of the collection information of the each collection comprises the title information of the each collection and attribute information of the target entity.

4. The method of claim 1, wherein in response to determining that the presentation scenario is the recommendation scenario, presenting the all or the part of the collection information of the at least one collection according to the presentation scenario comprises:

presenting part of collection information of any collection of the at least one collection in a form of a card on a recommendation information page, wherein the part of the collection information comprises title information of the any collection and attribute information of at least one target entity in the any collection, and at least one of the title information of the any collection or the at least one entity is associated with key content of recommendation information on the recommendation information page.

5. The method of claim 1, further comprising:

in response to a trigger operation on a target collection in the at least one collection, presenting title information of the target collection and attribute information of each entity in the target collection in a first presentation area of a collection detail page.

6. The method of claim 5, wherein in response to determining that a plurality of the collections are provided, the method further comprises:

presenting, in a second presentation area of the collection detail page, at least one of title information of another collection in the plurality of the collections except the target collection or attribute information of a second preset number of entities in the another collection.

7. A non-transitory computer-readable storage medium, which stores a computer program configured to execute the information presentation method of claim 1.

8. An information presentation method, comprising:

acquiring a collection constituent element, and creating, based on the collection constituent element, at least one collection, wherein each collection of the at least one collection comprises a plurality of entities satisfying the collection constituent element;

determining collection information of the at least one collection, wherein the collection information comprises title information of each collection of the at least one collection and attribute information of each entity in the each collection, the attribute information of the each entity matches the title information of the each collection, the title information of the each collection comprises keywords under different attribute dimensions, and the attribute information of each entity comprises an entity name and a feature text that matches a keyword of the keywords under the different attribute dimensions in the title information of a respective one of the at least one collection; and sending the collection information of the at least one collection to a client so that in response to detecting a preset trigger operation of a user, the client presents all or part of the collection information of the at least one collection corresponding to the preset trigger operation;

wherein the all or the part of the collection information of the at least one collection is presented by determining a presentation scenario of the collection information, wherein the presentation scenario comprises at least one of an encyclopedia scenario, a recommendation scenario, or a search scenario; and presenting the all or the part of the collection information of the at least one collection according to the presentation scenario; and wherein in response to determining that the presentation scenario is the encyclopedia scenario, the all or the part of the collection information of the at least one collection is presented according to the presentation scenario by:

presenting the all or the part of the collection information of the at least one collection in a form of a card in a collection presentation area of an encyclopedia detail page, wherein the collection information comprises the title information of the each collection and attribute information of a first preset number of entities in the each collection, and the first preset number of entities comprise a target entity corresponding to the encyclopedia scenario.

9. The method of claim 8, wherein the feature text matches the title information of the each collection, and determining the attribute information of the each entity in the collection information comprises:

determining an attribute dimension comprised in the title information of the each collection; and extracting a respective feature text of the each entity under the attribute dimension from an entity database.

10. The method of claim 9, wherein determining the attribute dimension comprised in the title information of the each collection comprises:

segmenting the title information of the each collection to obtain at least one core word; and determining a target mapping word that matches the at least one core word, and determining an attribute keyword associated with the target mapping word as the attribute dimension comprised in the title information of the each collection.

11. The method of claim 10, wherein determining the target mapping word that matches the at least one core word comprises:

determining similarity between each core word of the at least one core word and a plurality of mapping words in a mapping thesaurus; and determining a mapping word whose similarity is greater than a similarity threshold as the target mapping word.

12. The method according to claim 9, wherein extracting the respective feature text of the each entity under the attribute dimension from the entity database comprises:

searching, according to the attribute dimension and a respective entity identifier of the each entity, the entity database to determine a respective attribute value corresponding to the each entity; and determining the respective attribute value corresponding to the each entity as the respective feature text of the each entity under the attribute dimension.

13. The method of claim 8, wherein creating, based on the collection constituent element, the at least one collection comprises:

matching the collection constituent element with key information of a plurality of candidate entities in an entity database;

classifying a plurality of successfully matched target candidate entities to obtain collections of target candidate entities of a plurality of categories; and selecting a plurality of entities from collections of target candidate entities of each category of the plurality of categories separately to obtain the at least one collection.

14. The method of claim 8, wherein determining the title information of the each collection comprises:

clustering and screening multimedia information of the each entity in the each collection, determining a respective category keyword in the collections of target candidate entities of the each category, and determining, according to the respective category keyword, the title information of the each collection.

15. An electronic device, comprising:

a processor; and a memory configured to store instructions executable by the processor; wherein the processor is configured to read the executable instructions from the memory and execute the instructions to implement the information presentation method of claim 8.

16. A non-transitory computer-readable storage medium, which stores a computer program configured to execute the information presentation method of claim 8.

17. An electronic device, comprising:

a processor; and a memory configured to store instructions executable by the processor; wherein the processor is configured to read the executable instructions from the memory and execute the instructions to implement the following steps:

in response to detecting a preset trigger operation of a user, acquiring collection information of at least one collection corresponding to the preset trigger operation, wherein the collection information comprises title information of each collection of the at least one collection and attribute information of a plurality of entities in the each collection, the title information of the each collection comprises keywords under different attribute dimensions, attribute information of each entity of the plurality of entities matches the title information of the each collection, and the attribute information of each entity comprises an entity name and a feature text that matches a keyword of the keywords under the different attribute dimensions in the title information of a respective one of the at least one collection; and presenting all or part of the collection information of the at least one collection;

wherein presenting the all or the part of the collection information of the at least one collection comprises: determining a presentation scenario of the collection information, wherein the presentation scenario comprises at least one of an encyclopedia scenario, a recommendation scenario, or a search scenario; and presenting the all or the part of the collection information of the at least one collection according to the presentation scenario; and wherein in response to determining that the presentation scenario is the encyclopedia scenario, presenting the all or the part of the collection information of the at least one collection according to the presentation scenario comprises:

presenting the all or the part of the collection information of the at least one collection in a form of a card in a collection presentation area of an encyclopedia detail page, wherein the collection information comprises the title information of the each collection and attribute information of a first preset number of entities in the each collection, and the first preset number of entities comprise a target entity corresponding to the encyclopedia scenario.

* * * * *